United States Patent
Sasaki et al.

(10) Patent No.: US 8,023,036 B2
(45) Date of Patent: Sep. 20, 2011

(54) AUTOMATIC FOCUSING SYSTEM FOCUS AREA CONTROL

(75) Inventors: Tadashi Sasaki, Saitama (JP); Nobuo Matsui, Saitama (JP)

(73) Assignee: Fujifilm Corporation, Tokyo (JP)

( * ) Notice: Subject to any disclaimer, the term of this patent is extended or adjusted under 35 U.S.C. 154(b) by 906 days.

(21) Appl. No.: 11/191,065

(22) Filed: Jul. 28, 2005

(65) Prior Publication Data

US 2006/0023110 A1 Feb. 2, 2006

(30) Foreign Application Priority Data

Jul. 30, 2004 (JP) ................................ 2004-223802

(51) Int. Cl.
*G03B 13/00* (2006.01)
*H04N 5/232* (2006.01)
*H04N 5/225* (2006.01)

(52) U.S. Cl. .......................... 348/345; 348/375; 396/147

(58) Field of Classification Search ............. 348/208.12, 348/208.14, 211.4, 211.7, 345, 346; 396/147
See application file for complete search history.

(56) References Cited

U.S. PATENT DOCUMENTS

| | | | | |
|---|---|---|---|---|
| 4,389,675 A | * | 6/1983 | Suzuki et al. | 348/376 |
| 4,959,729 A | * | 9/1990 | Fukuda et al. | 348/375 |
| 5,633,680 A | | 5/1997 | Kaneko et al. | |
| 6,219,098 B1 | | 4/2001 | Kawamura et al. | |
| 6,480,681 B1 | * | 11/2002 | Neil | 396/373 |
| 6,556,246 B1 | * | 4/2003 | Suda | 348/352 |
| 6,707,501 B1 | * | 3/2004 | McKay et al. | 348/373 |
| 6,812,968 B1 | * | 11/2004 | Kermani | 348/345 |
| 6,853,502 B2 | * | 2/2005 | Sasaki | 359/698 |
| 7,003,223 B2 | * | 2/2006 | Sasaki et al. | 396/103 |
| 7,224,397 B2 | * | 5/2007 | Sasaki | 348/348 |
| 7,636,122 B2 | * | 12/2009 | Matsui | 348/345 |
| 7,689,112 B2 | * | 3/2010 | Sasaki | 396/147 |

FOREIGN PATENT DOCUMENTS

| | | |
|---|---|---|
| JP | 1-174176 A | 7/1989 |
| JP | 10-170861 | 6/1998 |
| JP | 2002-365519 A | 12/2002 |
| JP | 2002365519 A * | 12/2002 |
| WO | WO-02/052393 A1 | 7/2002 |

OTHER PUBLICATIONS

JP 2002365519 A ( Machine English Translation).*
"Lanc Videocamera Remote Control", Gruppo Manfrotto, 2002, XP002545616, Retrieved from the Internet: URL:http://ww.manfrotto.com.au/PDFPages/man-vid.522.pdf>

* cited by examiner

*Primary Examiner* — David Ometz
*Assistant Examiner* — Carramah J Quiett
(74) *Attorney, Agent, or Firm* — Birch, Stewart, Kolasch & Birch, LLP

(57) ABSTRACT

In a focus demand connected to a lens unit of a television camera, a joystick for designating the direction of movement of an AF area is disposed. A direction change switch for reversing the direction of movement of the AF area with respect to the direction of operation of the joystick is also provided. The focus demand is reversed in vertical and horizontal directions between the case of being mounted to be operated by the right hand and the case of being mounted to be operated by the left hand.

8 Claims, 6 Drawing Sheets

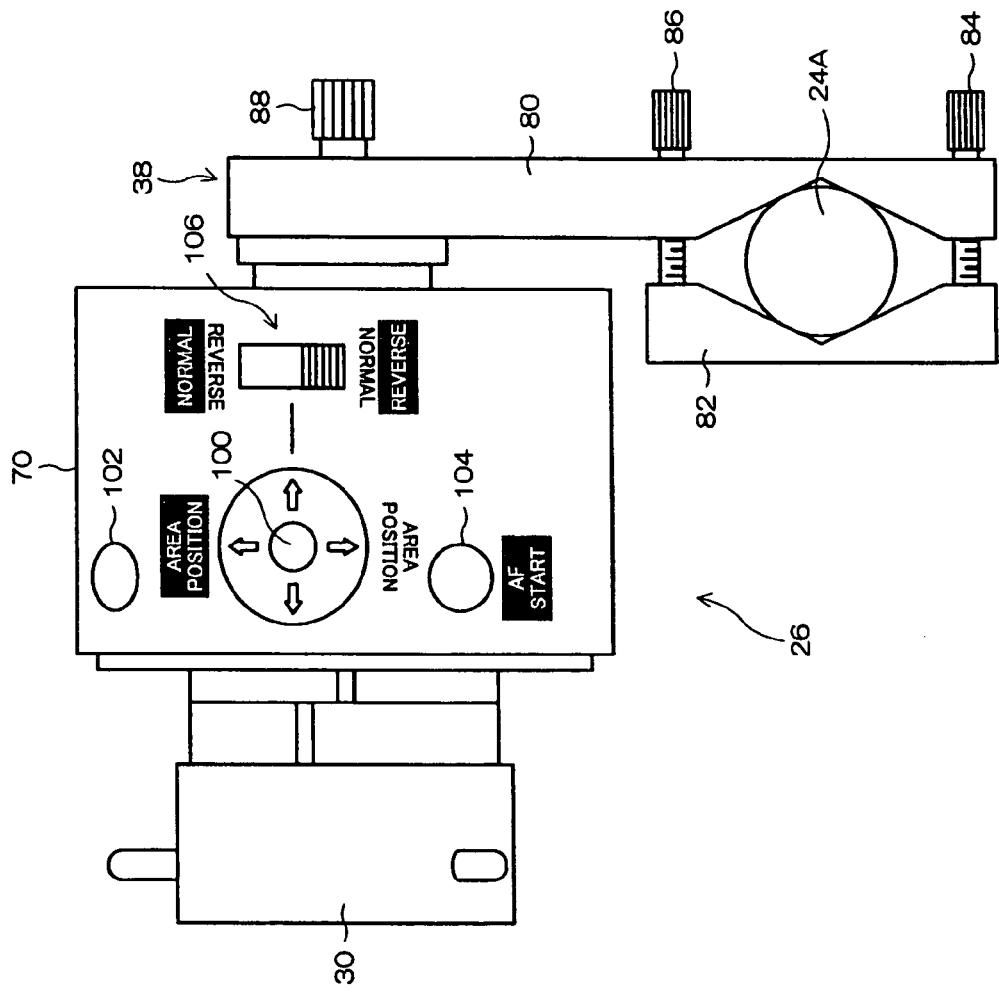

AUTOMATIC FOCUSING SYSTEM FOCUS AREA CONTROL

BACKGROUND OF THE INVENTION

1. Field of the Invention

The present invention relates to an automatic focusing system and, more particularly, to an automatic focusing system capable of moving to a desired position an automatic focusing (AF) area in the image pickup area of a camera on which automatic focusing is performed.

2. Related Art

A contrast method is ordinarily used as an automatic focusing (AF) method in image pickup systems such as television cameras in which an image of a subject is converted into an electrical signal (image signal) by an image pickup device (CCD or the like). In the contrast method, a contrast in a subject image taken in by an image pickup device is detected from an image signal (video signal) for the subject image, and focusing of a picture-taking lens (focusing lens) is controlled so that the contrast is maximized, thus automatically performing focusing to the best focus.

In ordinary cases, AF based on the contrast method is performed not on the entire subject in the image pickup area of a camera, i.e., the area of a subject or a subject image through which an image imaged through an optical system is effectively taken as a picture, but on a subject within a restricted portion of the image pickup area. For example, an image signal for a predetermined area on which AF is to be performed in an image signal for a subject image effectively taken as a picture by an image pickup device is extracted and focusing is controlled on the basis of the extracted signal for the predetermined area so that the contract of the image is maximized. In this way, AF is restrictedly performed on a subject within a restricted area. In the present invention, the area on which AF is performed is referred to as "AF area" and a frame indicating the bounds of the AF area (the contour of the AF area) is referred to as "AF frame".

In ordinary cases of fixing one AF area at a predetermined position in the image pickup area, the AF area is a rectangular area set at a center of the image pickup area. However, cameras are known in which an AF area can be changed to a desired position by a designation operation performed by an operator (see, for example, Japanese Patent Application Laid Open No. 2002-365519. As a method of designating the position of an AF area, a method has been used in which a direction designation member (AF area movement designation member) such as a joystick or a track ball in a predetermined AF area designation section is operated to move an AF area in a suitable direction with respect to the image pickup area and to thereby move the AF area to a target position.

SUMMARY OF THE INVENTION

In a large television camera system in which camera is moved, panned and tilted while being mounted on a pedestal called a pedestal dolly through a head, a controller for remote control is used for operations performed by a cameraperson mainly during picture taking to enable the cameraperson to perform the operations at a position closer to his/her body. Focusing and zooming operations are performed by using special-purpose controllers respectively provided for them. A pair of left and right control rods for pan and tilt operations of the camera performed by the cameraperson (pan and tilt rods) are ordinarily provided on the pedestal (the head on the pedestal) in a state of extending from the pedestal. A focus controller for controlling focusing is provided on a grip portion of one of the control rods, while a zoom controller for controlling zooming is provided on a grip portion of the other control rod.

There is a possibility of operation relating to the AF area being performed during picture taking. It is desirable to provide an operating section (AF area designation section) for such an operation within the cameraperson's reach. Therefore, an arrangement in which a special-purpose controller having such an AF area designation section is mounted on the operating rod and an arrangement in which operating members or functions used as such an AF area designation section are provided on the focus controller or the zoom controller are conceivable.

Camera systems have already been provided in which operating members or functions for performing operations other than the ordinary focusing operation or the zooming operation are provided on the focus controller or the zoom controller. Operating members or functions for the AF area designation section are considered to be advantageous if they are provided on the focus controller for example, because the cameraperson's hand not used at the time of AF can be used for an AF area operation.

It is a common practice to provide the focus controller on the right control rod and the zoom controller on the left control rod and to operate the focus controller and the zoom controller by the right hand and the left hand, respectively. However, the placement of each of the focus controller and the zoom controller as to on which control rod it is mounted is not particularly determined. In some case of use by either of a left-handed cameraperson and a right-handed cameraperson, the facility with which the controllers are handled can be improved by reversing the positions of the focus controller and the zoom controller between the left and right positions. In such a case, the focus controller and the zoom controller may be mounted on the left and right rods, respectively.

For this reason, if the AF area designation section is provided on the focus controller for example, there is a possibility of the position of operating members in the AF area designation section being reversed in vertical and horizontal directions between a case where the focus controller is mounted on the right control rod and a case where the focus controller is mounted on the left control rod. In such a case, the direction in which a direction designation member such as a joystick is operated to move the AF area in the upward, downward, leftward or rightward direction is also reversed in the vertical and horizontal directions. For example, while the relationship between the direction of operation of the direction designation member and the direction of movement of the AF area resulting from the operation of the direction designation member as recognized in feeling is normal in the case where the focus controller is mounted on the right control rod, therefore (the case where the controller is operated by the right hand), the direction of operation of the direction designation member and the direction of the AF area resulting from the operation of the direction designation member are reversed relative to each other in the case where the focus controller is mounted on the left control rod (the case where the controller is operated by the left hand). In this case, the cameraperson feels that the direction of movement of the AF area and the operation by the cameraperson do not coincide with each other and, therefore, the operability of the camera system is low.

In view of the above-described circumstances, an object of the present invention is to provide an automatic focusing system which enables an operator to move the position of the AF area by operating a designation member in the AF area designation section for moving the position of the AF area, without any feeling of strangeness, even when the designation member is placed by being reversed.

To achieve the above-described object, according a first aspect of the present invention, there is provided an automatic focusing system in which a picture-taking lens is automatically focused on a subject within the bounds of an AF area in an image pickup area of a camera by controlling focusing of the picture-taking lens, the system including an AF area movement designation member for moving the position of the AF area, the AF area movement designation member being placed so as to be reversible in upward, downward, leftward and rightward directions as seen from a position in front of the AF area movement designation member, an AF area moving device which moves the position of the AF area in a direction designated by the AF area movement designation member, and a direction changing device which reverses the direction of operation of the AF area movement designation member in the vertical and horizontal directions between a case where the AF area movement designation member is mounted in a reversed state and a case where the AF area movement designation member is mounted in a non-reversed state.

According to the first aspect of the present invention, even when the AF area designation member is placed by being reversed, the relationship between a direction of operation of the AF area designation member and a direction of movement of the AF area resulting from the direction of operation of the AF area designation member can be reversed, thereby enabling the operator to perform an AF area operation without any feeling of strangeness.

According to a second aspect of the present invention, the automatic focusing system of the first aspect further has a display device which displays on a display screen a picture taken by the camera, which displays on the display screen the bounds of the AF area in the picture, and which moves the position of the AF area displayed on the display screen as the position of the AF area is moved by the AF area moving device. In the second aspect, the bounds of the AF area are displayed on the display screen of a viewfinder or the like together with the taken picture and the position of the AF area is moved according to the operation of the AF area movement designation member, thereby enabling the operator to set the AF area at a desired position while observing the position of the AF area on the display screen.

According to a third aspect of the present invention, in the automatic focusing system of the first aspect, the AF area movement designation member is placed in a predetermined controller. In the controller, operating members used for the same purpose are placed in positions vertically or horizontally symmetrical as seen from the position in front of the AF area movement designation member with respect to the position in which the AF area movement designation member is placed. According to the third aspect, when the AF area movement designation member is placed by being reversed, an operating member other than the AF area movement designation member is also placed by being reversed. Consequently, there is a possibility of the positional relationship between the operating member and the AF area movement designation member being changed to reduce the facility when the operating member is operated. In the third aspect, the operating members used for the same purpose is placed in positions vertically or horizontally symmetrical with respect to the AF area movement designation member to solve this problem.

According to a fourth aspect of the present invention, in the automatic focusing system of the first aspect, the AF area movement designation member is placed in a focus controller having a rotating member for focusing operation and a changing device which reverses the direction of movement of the focus with respect the direction of rotation of the rotating member, and the direction changing device reverses the direction of movement of the AF area in a linked relationship with the changing device. According to the fourth aspect, in some case of placing the focus controller in a reversed state relative to the standard condition, by reversing the direction of movement of the focus with respect to the direction of rotation of the rotating member for focusing relative to the standard direction, the facility when operating the rotating member can be improved in either of the case of operating with the left hand and the case of operating with the right hand. Since changing of the direction and changing of the direction of movement of the AF area are linked, the need for separately performing the corresponding changing operations can be eliminated, and the number of components parts such as switches can be reduced.

The automatic focusing system of the present invention enables the operator to move the position of the AF area by operating the designation member in the AF area designation section for moving the position of the AF area, without any feeling of strangeness, even when the designation member is placed by being reversed.

BRIEF DESCRIPTION OF THE DRAWINGS

FIG. 6 is an enlarged front view of the focus demand as seen from the cameraperson standing position when the focus demand is mounted be operated by the left hand.

DETAILED DESCRIPTION OF THE PREFERRED EMBODIMENTS

A preferred embodiment of an automatic focusing system in accordance with the present invention will be described with reference to the accompanying drawings.

Figure 1:
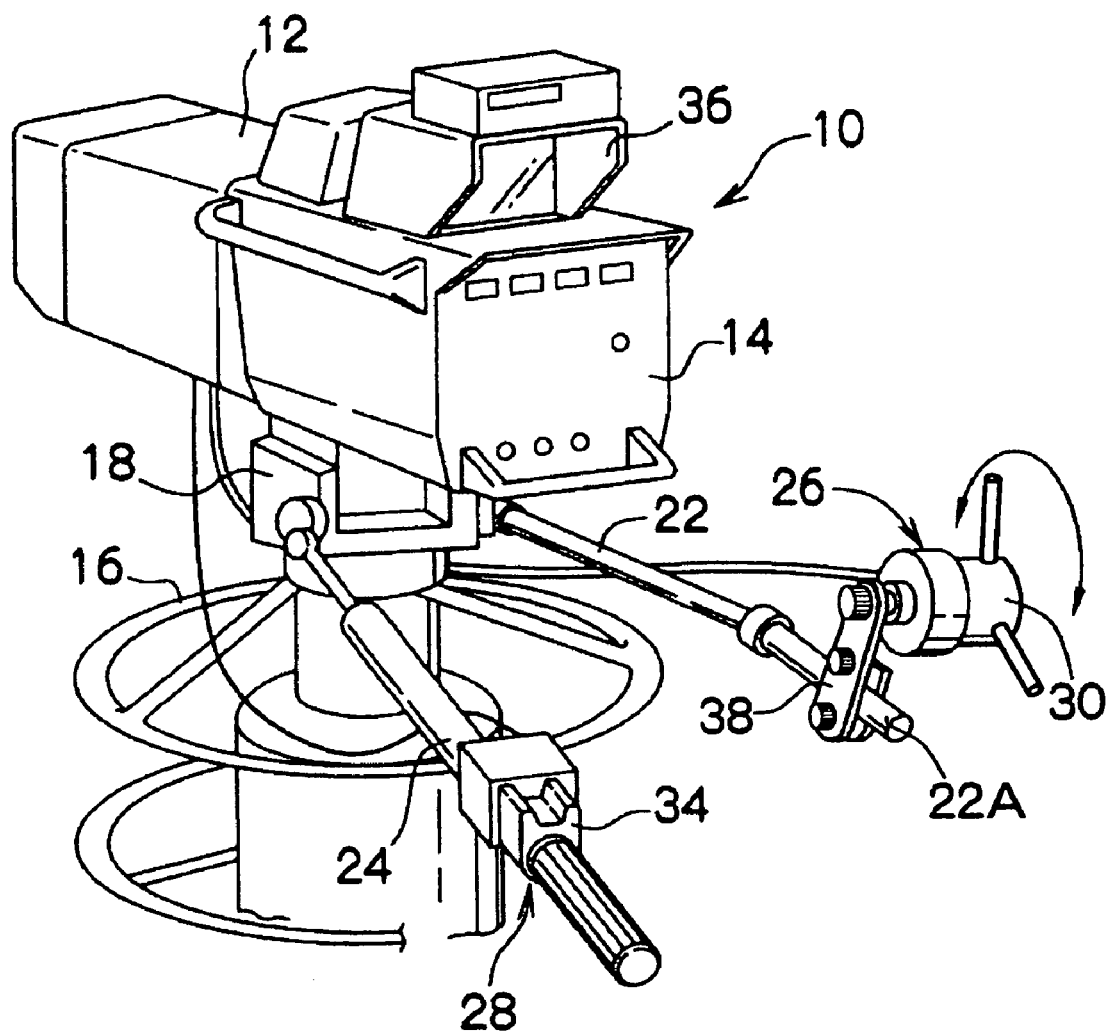
FIG. 1 is a diagram showing an external appearance of an embodiment of a television camera system to which the present invention is applied.

FIG. 1 is a diagram showing an external appearance of an embodiment of a television camera system to which the present invention is applied. As shown in FIG. 1, a television camera 10 is constituted by a lens unit 12 and a main camera unit 14 and is supported on a head 18 mounted on a pedestal dolly 16.

Two control rods 22 and 24 extend from the head 18. A focus demand (focus controller) 26 is mounted on a grip portion of the right control rod 22 by a mounting clamp 38, while a zoom demand (zoom controller) 28 is mounted on a grip portion of the left control rod 24. The focus demand 26 and the zoom demand 28 are connected to predetermined connectors on the lens unit 12.

A rotatable focusing knob 30 is provided on the focus demand 26. When the focusing knob 30 is rotated, a focus control signal for a command to move the focus (focusing lens) to a target focus position corresponding to the rotated position of the focusing knob 30 is supplied from the focus demand 26 to the lens unit 12. The focusing lens of the lens unit 12 is moved to the target position designated by the focus control signal.

AF area designation section including an automatic focusing (AF) start switch for input a command to start automatic focusing (AF) and an operating member such as a joystick for changing the position of an AF area which is an area on which AF is performed is provided integrally with the focus demand 26, as described below in detail.

A rotatable thumb ring 34 is provided on the zoom demand 28. When the thumb ring 34 is turned clockwise or anticlockwise, a zoom control signal for a command to move the zoom (zoom lens) at a target zoom speed according to the rotated position of the thumb ring 34 is supplied from the zoom demand 28 to the lens unit 12. The zoom lens of the zoom unit 12 is moved at the target speed designated by the zoom control signal.

viewfinder 36, which is a display unit, is mounted on the main camera unit 14. An image of a subject taken by the camera 10 is displayed on the viewfinder 36. A cameraperson can take a picture of a subject in a desired composition by operating the focus demand 26 and the zoom demand 28 while observing the image on the viewfinder 36. The AF area, which is an area on which focusing (AF) is performed, can be indicated by an AF frame corresponding to the contour of the AF area. The AF frame is displayed by being superimposed on the subject image on the screen, thereby enabling the cameraperson to know in which area in the picture-taking area (image pickup area) the camera can be focused on the subject and to change the position of the AF area to a desired point on the subject in the picture-taking area by operating the AF area designation section provided in the focus demand 26.

Figure 2:
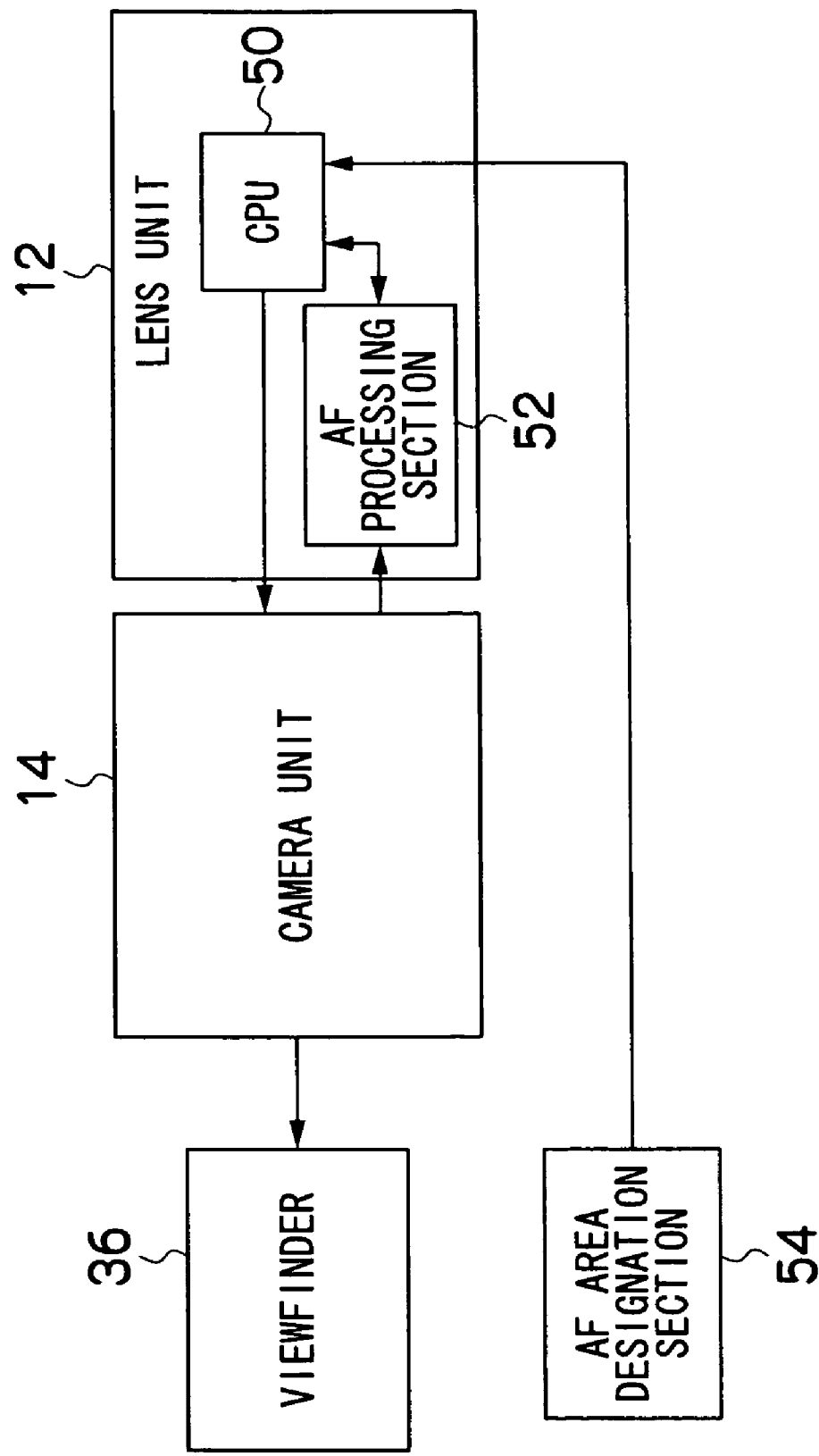
FIG. 2 is a block diagram showing the configuration of an automatic focusing system.

FIG. 2 is a block diagram showing the configuration of an automatic focusing system applied to the above-described television camera system. The automatic focusing system shown in FIG. 2 is constituted by the lens unit 12, the main camera unit 14, viewfinder 36, and an AF area designation section 54 provided in the focus demand 26.

The lens unit 12 incorporates a CPU 50 and an AF processing section 52. The lens unit 12 also has an optical system (not shown) (picture-taking lens) through which subject light is imaged on the image pickup surface of an image pickup device in the main camera unit 14. In the optical system, groups of lenses movable in the optical axis direction, including the focusing lens and the zoom lens, and groups of fixed lenses, etc., are disposed. Each movable lens group is driven by a motor (not shown) according to a control signal from the CPU 50. The positions and speed of the focusing lens, the zoom lens, etc., are controlled by the CPU 50.

Control of the focus lens (focus control) comprises manual focusing (MF) and AF. When MF is performed, the CPU 50 obtains a focus control signal output from the focus demand 26 shown in FIG. 1 according to a focusing knob 30 operation, and controls the focusing lens so that the focusing lens reaches the target position designated by the focus control signal.

When AF is performed, information on the state of focusing (focus evaluation value) detected by the AF processing section 52 is supplied to the CPU 50. The CPU 50 controls the focusing lens on the basis of the focusing state information. In the main camera unit 14, a video signal of a picture taken by the image pickup device is generated. The video signal (luminance signal) is supplied from the main camera unit 14 to the AF processing section 52. In the AF processing section 52, processing for detecting a contrast in the subject image is performed on the basis of the video signal.

Figure 3:
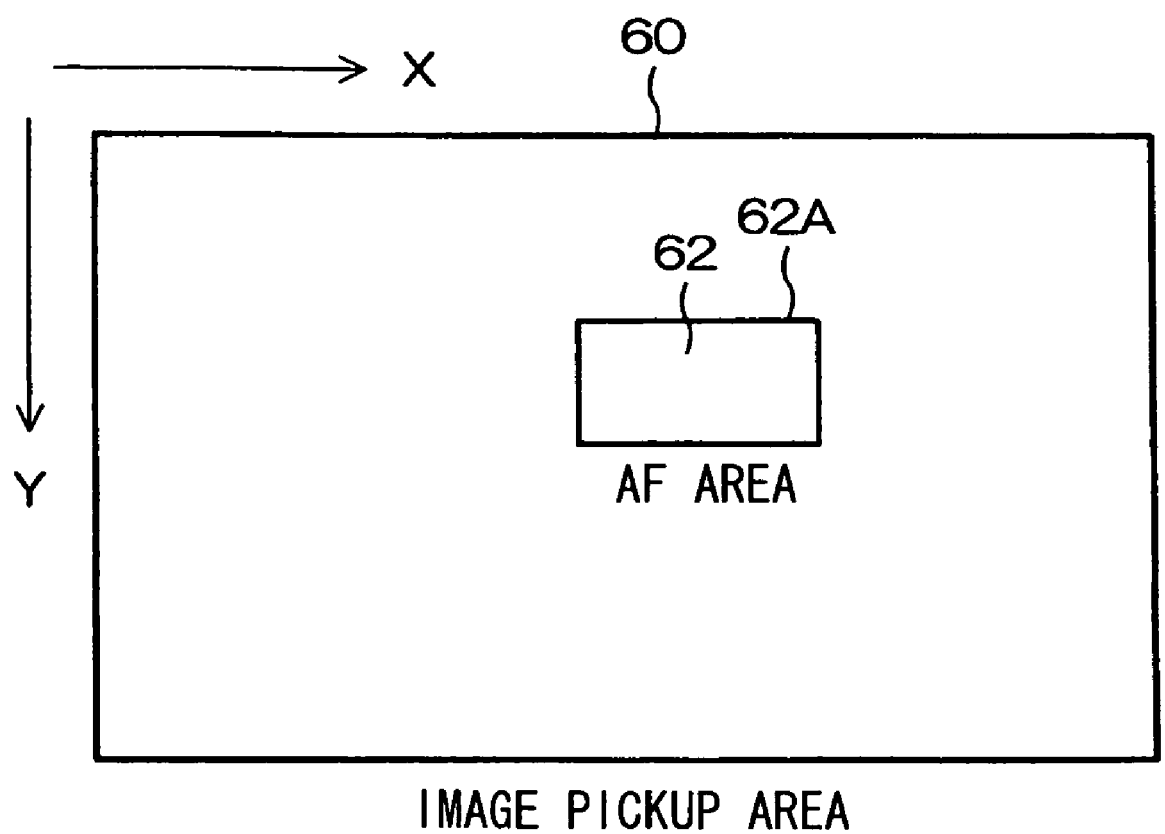
FIG. 3 is a diagram showing an example of the bounds of an AF area in an image pickup area.

The image pickup area is assumed to be the area of a subject or a subject image through which picture taking is effectively performed by the image pickup device in the main camera unit 12. As shown in FIG. 3, an AF area 62 set as an AF target area with respect to the image pickup area 60 is set as an area in a rectangular AF frame 62A for example. The position of the AF area in the image pickup area is changed according to a designation from the AF area designation section 54, as described below. The image pickup area 60 shown in FIG. 3 corresponds to the picture-taking area of the television camera 10. Also, when a subject image (picture) taken by the image pickup device in the main camera unit 14 is reproduced and displayed on the screen of the viewfinder 36 or the like, the image pickup area 60 corresponds to the image area of the picture.

The video signal supplied from the main camera unit 14 to the AF processing section 52 in the system shown in FIG. 2 includes video information on the entire image pickup area 60. The AF processing section 52 extracts only the portion of the video signal corresponding to the AF area 62 and totalizes a high-frequency component of the video signal on a field-by-field basis (for each screenful of image) to obtains values indicating degrees of contrast of the subject image in the AF area 62 one after another. The value (totalized value) is referred to as "focus evaluation value" in this specification.

The CPU 50 obtain focus evaluation values one by one as focusing state information from the AF processing section 52 and moves the focusing lens to the position corresponding to the highest (maximum) focus evaluation value. In this way, the focusing lens can be automatically focused on the object in the AF area 62.

The video signal obtained by the image pickup device in the main camera unit 14 is supplied from the main camera unit 14 to the viewfinder 36. The picture presently taken is displayed on the screen of the viewfinder 36. AF area information indicating the bounds of the AF area presently set (information on the position and size of the AF area) is supplied from the CPU 50 in the lens unit 12 to the main camera unit 14. In the main camera unit 14, a signal for the AF frame (the contour of the AF frame) indicating the bounds of the present AF area is combined with the video signal to be output to the viewfinder 36 based on the AF area information. An AF frame 62A indicating the bounds of the present AF area is displayed on the screen of the viewfinder 36 together with the picture in the image pickup area 60, as shown in FIG. 3, thereby enabling the cameraperson to recognize the bounds of the present AF area.

In the AF area designation section 54 (focus demand 26), a designation member for designating the position of the AF area is provided, as described below. By an operation using the designation member, a designation value indicating the position of the AF area is transmitted from the AF area designation section 54 to the CPU 50 in the lens unit 12. It is assumed here that, in an X-Y coordinate system the X-axis and Y-axe of which correspond, for example, to the horizontal direction and the vertical direction, respectively, of the image pickup area 60 shown in FIG. 3, the position of the AF area is indicated using the coordinate value of the AF area 62 center position. Then, the AF area designation section 54 transmits to the CPU 50 in the lens unit 12 coordinate values indicating the AF area center position as designation values designating the position of the AF area.

The CPU 50 in the lens unit 12 sets as the AF area a rectangular area of a predetermined size having a center corresponding to the coordinate values supplied from the AF area designation section 54, and designates the bounds of the AF area in the AF processing section 52. Focus evaluation values with respect to the subject image in the AF area designated by the AF area designation section 54 are then obtained from the AF processing section 52. The focusing lens is controlled on the basis of the focus evaluation values to be focused on the subject in the AF area.

The CPU 50 also supplies the AF area information indicating the bounds of the set AF area to the main camera unit 14 to display the AF frame for the bounds of the set AF area on the viewfinder 36. The position of the AF frame displayed on the viewfinder 36 is moved on the screen in correspondence with the position of the AF area designated by the AF area designation section 54. The operator can designate the subject at a desired position as an AF target subject while observing the taken picture and the AF frame displayed on the viewfinder 36.

In this embodiment, only the position of the bounds of the AF area can be changed according to a designation from the AF area designation section 54. However, other elements relating to the bounds of the AF area, including the size and shape of the AF area, may be changed according to designations from the AF area designation section 54.

The construction of the AF area designation section 54 will be described. Operating members and the functions of the AF area designation section 54 are provided in the focus demand 26 shown in FIG. 1 together with the essential operating members and functions of the focus demand 26.

Figure 4:
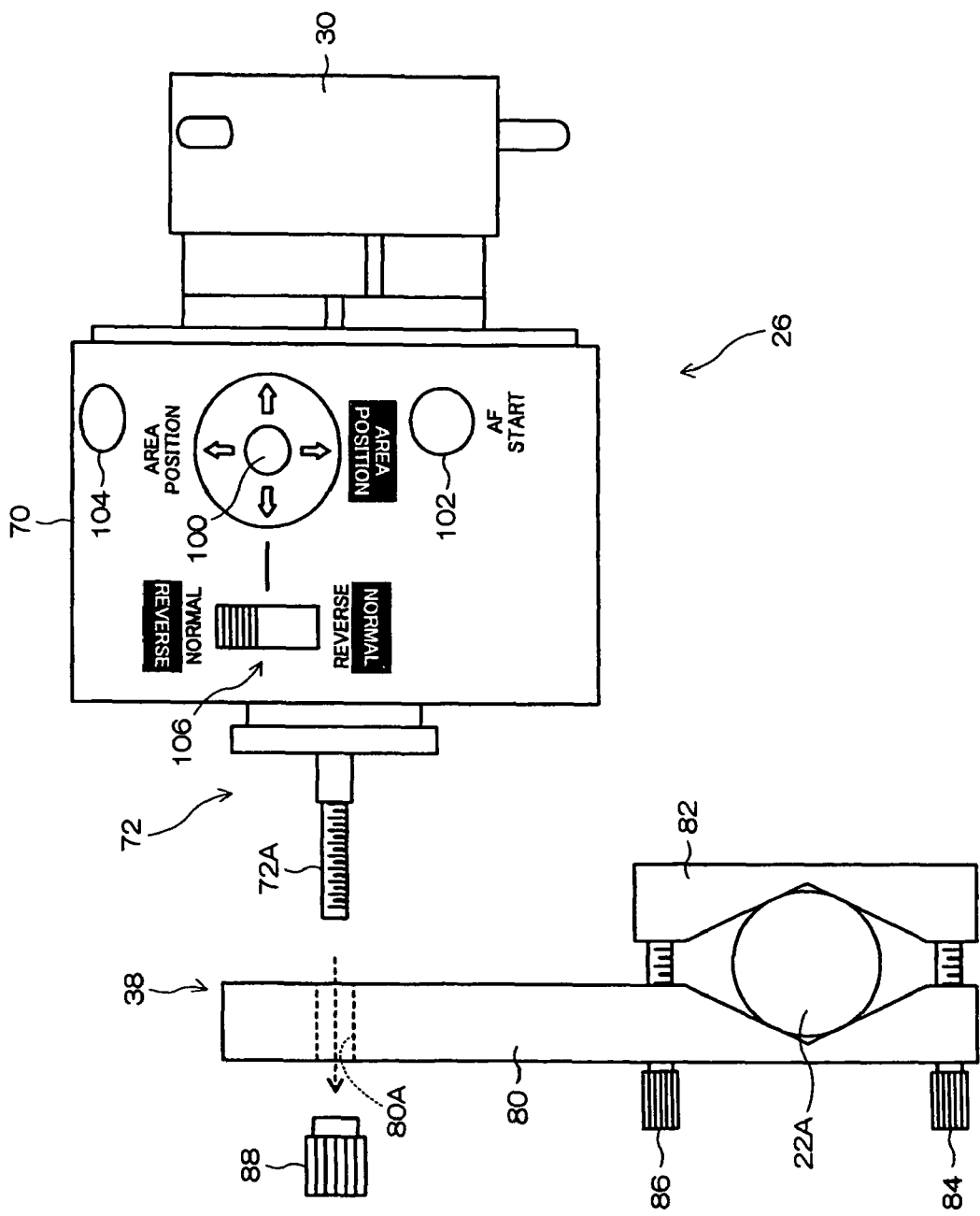
FIG. 4 is an enlarged front view, seen from a cameraperson standing position, of a focus demand mounted to be operated by right hand.

FIG. 4 is an enlarged front view, seen from the cameraperson standing position, of the focus demand 26 shown in FIG. 1. As shown in FIG. 4, the focus demand 26 has a main body 70 incorporating various circuits including a CPU, a focusing knob 30, which is rotated during MF to designate a focusing lens movement target position, and a mount portion 72. The focus demand 26 can be mounted so as to be operable by either of the right and left hands of the cameraperson, depending on the facility with which the focus demand 26 is operated by the hand. For example, when the focus demand 26 is operated by the right hand, it is mounted on the control rod 22 extending from the head 18 on the right-hand side as shown in FIG. 1 (on the right-hand side as seen from the cameraperson standing position). When the focus demand 26 is operated by the left hand, it is mounted on the left control rod 24. In the enlarged view of FIG. 4, a case where the focus demand 26 is mounted to be operated by the right hand is shown. In this case, the focus demand 26 is mounted on the grip portion 22A of the control rod 22 on the right-hand side by the mounting clamp 38.

The mounting clamp 38 has an arm member 80 and a clamping member 82. The mounting clamp 38 is fixed on the grip portion 22A by fixing the clamping member 82 to the arm member 80 with screws 84 and 86 in a state where the grip portion 22A of the control rod 22 is interposed and pinched between the arm member 80 and the clamping member 82. An insertion hole 80A is provided in an upper portion of the arm member 80. The focus demand 26 is fixed on the arm member 80 by inserting a threaded hole 72A in the mount portion 72 of the focus demand 26 in the insertion hole 80A from the right-hand side of the same and by screwing a fixing member 88 having a threaded hole around the threaded portion 72A on the left-hand side of the same. The focus demand 26 is thereby mounted on the grip portion 22a of the right control rod 22 with the focus knob 32 facing right.

Figure 5:
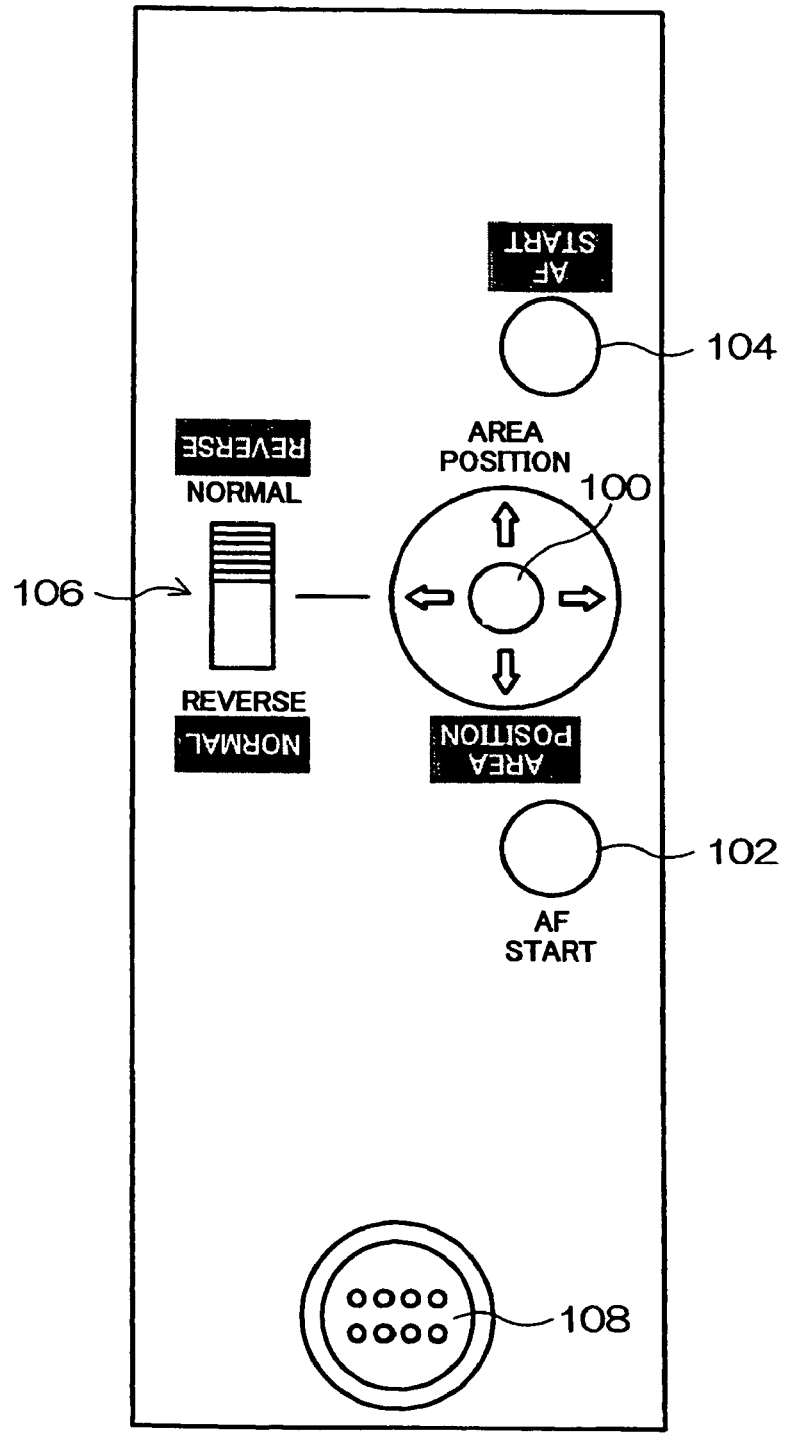
FIG. 5 is a diagram showing an developed view of the peripheral surface of the main body of the focus demand.

Operating members of the AF area designation section 54 are provided in a peripheral surface of the main body 70 of the focus demand 26. A joystick 100, which is a direction designation member for designating a direction in which the AF area should be moved, AF start switches 102 and 104 for starting AF, and a direction change switch 106 for changing the direction of movement of the AF area with respect to the direction of operation of the joystick 100 are provided, as shown in FIG. 4. FIG. 5 is a diagram showing a developed view of the peripheral surface of the main body 70 of the focus demand 26. The AF start switches 102 and 104 are placed at positions vertically symmetrical with respect to the joystick 100. The AF start switches 102 and 104 are used for the same purpose. In a case where the focus demand 26 is mounted on the right control rod 22 to be operated by the right hand as shown in FIG. 4, the AF start switch 102 placed below the joystick 100 is in such a position as to be more easily operable by the right hand than by the left hand. In this case, therefore, the AF start switch 102 is mainly used. In a case where the focus demand 26 is mounted on the left control rod 24 by being reversed in vertical and horizontal directions (turned through 180 degrees) to be operated by the left hand as described below to thereby make the focus knob 32 face left, the AF start switch 104 is placed below the joystick 100 in such a position as to be more easily operable by the left hand than by the right hand. In this case, therefore, the AF start switch 104 is mainly used. A connector 108 to which a connection plug for a cable connected to the lens unit 12 is fitted is provided at a position opposite from these operating members.

In the main body 70 of the focus demand 26, sensors (switches) from which signals are output according to operations using the operating members and a CPU for performing various kinds of processing on the basis of the signals output from the sensors are incorporated. The CPU outputs a signal for starting AF to the CPU 50 in the lens unit 12, for example, when the AF start switch 102 or 104 is turned on. Change from AF to MF is performed by transmitting a signal for starting MF processing to the CPU 50 in the lens unit 12, for example, when a focusing knob 30 rotating operation is detected during AF.

When the joystick 100 is operated, the CPU in the focus demand 26 detects the direction in which the joystick 100 is operated and makes the lens unit 12 move the position of the AF area designated to the CPU 50 in the direction corresponding to the detected direction. That is, the designation value (e.g., the coordinate values of the AF area 62 center position in the X-Y coordinate system assumed with respect to the image pickup area 60 as shown in FIG. 3) transmitted to the CPU 50 in the lens unit 12 for designation of the position of the AF area is changed according to the direction of operation of the joystick 100, and the position of the AF area set in the CPU 50 in the lens unit 12 is changed in the direction corresponding to the direction of operation of the joystick 100.

At this time, the CPU in the focus demand 26 detects the set state of the direction change switch 106 and changes the direction of movement of the AF area with respect to the direction of operation of the joystick 100 on the basis of the set state. The standard set state of the direction change switch 106 is the setting in the upper position as seen in FIG. 4 or 5 on the side of characters "NORMAL" in the normally oriented position), for example, in the case where the focus demand 26 is mounted on the right control rod 22 as shown in FIG. 1 or 3 to be operated by the right hand. In this case, the CPU in the focus demand 26 changes the designation value transmitted to the CPU 50 in the lens unit 12 so that the position of the AF area is moved in the same direction as the direction of operation of the joystick 100. For example, when the joystick 100 is operated in the leftward direction as seen from the position (in front) in front of the joystick 100, the designation value is changed so that the position of the AF area is moved in the leftward direction in the image pickup area. The AF frame is moved leftward on the screen of the viewfinder 36. Similarly, when the joystick 100 is moved in the rightward, upward or downward direction, the designation value is changed so that the position of the AF area is moved in the rightward, upward or downward direction in correspondence with the operation direction. Each time a lapse of time during which the joystick 100 is operated in a certain direction becomes equal to a predetermined time period, the CPU in the focus demand 26 changes the designation value so that the position of the AF area moves by a predetermined distance in the same direction as the operation direction. The speed at which the AF area is moved may be increased according to the amount of operation (tilt angle) of the joystick 100.

On the other hand, in the state where the direction change switch 106 is set in the lower position as seen in FIG. 4 or 5 on the side of characters "REVERSE" in the normally oriented position), the direction of movement of the AF area is reversed. In this case, the CPU in the focus demand 26 changes the designation value so that the position of the AF area is moved in the direction opposite to the direction of operation of the joystick 100. For example, when the joystick 100 is operated in the leftward direction as seen in FIG. 4, the designation value is changed so that the position of the AF area is moved in the rightward direction in the image pickup area opposite to the operation direction. The AF frame is moved rightward on the screen of the viewfinder 36. Similarly, when the joystick 100 is moved in the rightward, upward or downward direction, the designation value is changed so that the position of the AF area is moved in the left, downward or upward direction opposite to the operation direction. That is, when the joystick 100 is operated in a certain direction, the CPU in the focus demand 26 regards the operation as performed in the direction, for example, vertically or horizontally opposite to the direction of the operation actually performed, and changes the designation value by the same processing as that in the case where the direction change switch 106 is in the standard state. Each time a lapse of time during which the joystick 100 is operated in a certain direction becomes equal to a predetermined time period, the CPU in the focus demand 26 changes the designation value so that the position of the AF area moves by a predetermined distance in the direction opposite to the operation direction, as it does in the case where the direction change switch 106 is in the standard state.

As a typical case of reversing the direction of movement of the AF area with respect to the direction of operation of the joystick 100, a case in which the focus demand 26 is mounted on the left control rod 24 shown in FIG. 1 by being reversed in the vertical and horizontal directions to be operated by the left hand is conceivable as well as a case where the reversed state is convenient for the operator in terms of handling. In this case, the zoom demand 28 is mounted on the right control rod 22. FIG. 6 is a front view of the focus demand 26 as seen from the cameraperson standing position when the focus demand 26 is mounted on the left control rod 24 to be operated by the left hand. As shown in FIG. 6, the focus demand 26 is mounted on the grip portion 24A of the left control rod 24 by the mounting clamp 34 shown in FIG. 4. At this time, the focus demand 26 is mounted by being reversed in the vertical and horizontal directions so that the focusing knob 30 is placed on the left-hand side as opposite the placement for operation by the right hand, and so that the operating members of the AF area designation section face frontward. When the focus demand 26 is mounted in this manner to be operated by the left hand, the direction of operation detected by the CPU in the focus demand 26 with respect to the upward, downward, leftward or rightward operation of the joystick 100 as seen in the figure is reversed relative to that in the case where the focus demand 26 is mounted to be operated by right hand. For example, when the joystick 100 is operated upward as seen from the position in front of the joystick 100 (in the upward direction as seen in FIG. 6) in the case of mounting for operation by the left hand, the CPU in the focus demand 26 recognizes the same operation as the downward operation of the joystick 100 in the case where the focus demand 26 is mounted to be operated by the right hand.

Accordingly, in the case where the focus demand 26 is set for operation by the left hand, when the joystick 100 is operated in the state where the direction change switch 106 is set, for example, in the lower position as seen in FIG. 6 (in the position on the inverted characters "NORMAL" side), i.e., in the standard state in the case of mounting of the focus demand 26 for operation by the right hand, the direction of movement of the AF area is opposite to the direction of operation of the joystick 100.

In the case where the focus demand 26 is set for operation by the left hand, therefore, the direction change switch 106 is set in the upper position (in the position on the inverted characters "REVERSE" side), i.e., in the reversed state in the case of mounting of the focus demand 26 for operation by the right hand, to achieve coincidence between the direction of operation of the joystick 100 and the direction of movement of the AF area, thus making the operation suitable for the cameraperson who wants to change the AF area in the standard state in the case of operation by the left hand.

In the case where the focus demand 26 is set to be operated by the left hand, the state reverse to that in the case of setting for operation by the right hand is the standard state. Accordingly, the characters normally oriented as shown in FIG. 6 in the case of setting for operation by the left hand are such that the state is which the direction change switch 106 is set in the upper position is "NORMAL", i.e., the standard state, and the state is which the direction change switch 106 is set in the lower position is "REVERSE", i.e., the reversed state, In the above-described embodiment, the relationship between the direction of operation of the joystick 100 and the direction of movement of the AF area resulting from the operation of the joystick 100 is changed between the standard and reversed states by the direction change switch 106. The relationship between the direction of rotation of the focusing knob 30 and the direction of movement of the focus (focusing lens) may also be changed between the standard and reversed state by being linked to changing of the relationship between the direction of operation of the joystick 100 and the direction of movement of the AF area.

While in the above-described embodiment, the relationship between the direction of operation of the joystick 100 and the direction of movement of the AF area resulting from the operation of the joystick 100 is changed between the standard and reversed states by the direction change switch 106, the arrangement may alternatively be such that the relationship between the direction of operation of the joystick 100 and the direction of movement of the AF area is automatically changed by detecting an upward/downward direction of a direction designation member such as the joystick 100 instead of being manually changed by using a member such as the direction change switch 106.

The embodiment has been described with the respect to a case where the joystick 100 is used as a direction designation member for designating the movement direction of the AF area (AF area movement designation member). However, any other direction designation member such as a track ball or a cross key capable of designating a direction according to the direction in which it is operated may alternatively be used.

The direction designation member is not necessarily formed by one operating member. For example, an arrangement may be adopted in which four button switches are disposed in vertical and horizontal directions and, when one of the button switches is operated, the direction of movement of the AF area corresponding to the upward, downward, leftward or eight ward direction of the operated button switch is designated. In such a case, an AF start switch for example may be placed at a center in the arrangement of the four button switches.

While in the above-described embodiment the AF start switches 102 and 104 are placed so as to be vertically symmetrical with respect to the joystick 100, the switches for the same purpose other than the above uses may also be placed so as to be vertically or horizontally symmetrical with respect to the joystick 100 to equalize the handling when the focus demand 26 is mounted for operation by the right hand and the handling when the focus demand 26 is mounted for operation by the left hand.

While the embodiment has been described with respect to a case where the AF area operating section is provided on the focus demand 26, the present invention can also be applied to a system in which the AF area operating section is provided in a special-purpose controller or a controller other than the focus demand 26.

The present invention can also be applied to AF other than AF based on the contrast method in the above-described embodiment.

What is claimed is:

1. An automatic focusing system in which a picture-taking lens is automatically focused on a subject within the bounds of an AF area in an image pickup area of a camera by controlling focusing of the picture-taking lens, the system comprising:
   an AF area movement designation member for moving the position of the AF area, the AF area movement designation member being placed so as to be reversible in upward, downward, leftward and rightward directions as seen from a position in front of the AF area movement designation member;
   an AF area moving device which moves the position of the AF area in a direction designated by the AF area movement designation member; and
   a direction changing device which reverses the direction of operation of the AF area movement designation member in vertical and horizontal directions between a case where the AF area movement designation member is mounted in a reversed state, in which the AF area moves in the direction opposite to the direction of movement of the AF area movement designation member, and a case where the AF area movement designation member is mounted in a non-reversed state, in which the AF area moves in the same direction of movement as the direction of movement of the AF area movement designation member, and the direction changing device is a second device, different from the AF area moving device,
   wherein the AF area movement designation member is placed in a focus controller having a rotating member for manual focusing operation.

2. The automatic focusing system according to claim 1, further comprising a display device which displays on a display screen a picture taken by the camera, which displays on the display screen the bounds of the AF area in the picture, and which moves the position of the AF area displayed on the display screen as the position of the AF area is moved by the AF area moving device.

3. The automatic focusing system according to claim 1, wherein, in a predetermined controller in which the AF area movement designation member is placed, operating members used for the same purpose are placed in positions vertically or horizontally symmetrical as seen from the position in front of the AF area movement designation member with respect to the position in which the AF area movement designation member is placed.

4. The automatic focusing system according to claim 1, wherein the AF area movement designation member is placed in a focus controller having a rotating member for focusing operation and a changing device which reverses the direction of movement of the focus with respect to the direction of rotation of the rotating member, and wherein the direction changing device reverses the direction of movement of the AF area in a linked relationship with the changing device.

5. The automatic focusing system according to claim 1, wherein the direction changing device is an electrical direction changing device.

6. The automatic focusing system according to claim 2, wherein the direction changing device is an electrical direction changing device.

7. The automatic focusing system according to claim 3, wherein the direction changing device is an electrical direction changing device.

8. The automatic focusing system according to claim 4, wherein the direction changing device is an electrical direction changing device.

* * * * *